UNITED STATES PATENT OFFICE.

JOSEPH C. TUCKER, OF NEW YORK, N. Y.

IMPROVEMENT IN ARTIFICIAL STONE.

Specification forming part of Letters Patent No. 170,132, dated November 16, 1875; application filed June 11, 1875.

*To all whom it may concern:*

Be it known that I, JOSEPH C. TUCKER, of the city, county, and State of New York, have invented a new and useful Improvement in Artificial Stone, which improvement is fully set forth in the following specification.

This invention relates to certain improvements on that class of artificial stones which I have described in my Patent No. 128,680, reissue No. 5,043, and which consists, essentially, of a compound of iron or other slag, mixed, while in a heated state, with crushed stone, or asphaltum, or hydraulic cement.

My present improvement consists in a compound for artificial stone made of iron or other slag, mixed, while in a warm or heated state, with asphaltum or other bituminous material, and with animal, vegetable, or mineral fibrous material.

In carrying out my present invention I take slag, (the refuse or residuum of blast or other furnaces,) and combine the same with asphaltum or other bituminous material while in a heated state, and to this mixture I add an animal, vegetable, or mineral fibrous material. The proportion in which I mix these ingredients together is about as follows: Slag, seventy parts; asphaltum or other bituminous material, twenty parts; fibrous material, ten parts. The slag, broken or crushed to a proper size, is placed within a rotating cylinder or other suitable mixer, where it is mechanically incorporated with the previously-prepared asphaltum and with the fibrous material, forming thus a homogeneous mass ready to be passed into molds of any desired form, and there subjected to pressure or concussion; or the plastic mass may be spread directly upon the ground or surface to be covered, and pressed, by means of rollers or otherwise, into any desired shape or device for ornament, or to secure better foot-hold for animals, or further used for any of the various purposes to which it may be applied.

The proportion in which the ingredients of my compound are mixed together varies, as required by the different purposes for which it is to be used.

What I claim as new, and desire to secure by Letters Patent, is—

An artificial stone produced by combining slag with asphaltum or other bituminous material while in a heated state, and with an animal, vegetable, or mineral fibrous material, in sheet or block, with or without pressure, substantially as set forth.

In testimony that I claim the foregoing I have hereunto set my hand and seal this 3d day of June, 1875.

JOSEPH C. TUCKER. [L. S.]

Witnesses:
W. HAUFF,
E. F. KASTENHUBER.